(12) United States Patent
Kojima

(10) Patent No.: US 8,190,946 B2
(45) Date of Patent: May 29, 2012

(54) FAULT DETECTING METHOD AND INFORMATION PROCESSING APPARATUS

(75) Inventor: Takahiro Kojima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 106 days.

(21) Appl. No.: 12/408,095

(22) Filed: Mar. 20, 2009

(65) Prior Publication Data

US 2009/0300424 A1 Dec. 3, 2009

(30) Foreign Application Priority Data

May 30, 2008 (JP) ................................ 2008-142285

(51) Int. Cl.
*G06F 11/00* (2006.01)
(52) U.S. Cl. ......................................... 714/10
(58) Field of Classification Search ...................... 714/10
See application file for complete search history.

(56) References Cited

U.S. PATENT DOCUMENTS 7,240,240 B2 * 7/2007 Balakrishnan et al. ......... 714/15

FOREIGN PATENT DOCUMENTS

JP  A 2007-133603  5/2007

* cited by examiner

*Primary Examiner* — Amine Riad
(74) *Attorney, Agent, or Firm* — Greer, Burns & Crain, Ltd.

(57) ABSTRACT

An information processing apparatus including a storage area separated into a user space and a kernel space executes, generating a core file of a process existing in the user space, retaining the process with the core file which starts being generated in the user space, and notifying a monitor unit of an identification number of the process with the core file which starts being generated, wherein the monitor unit detects a fault in the process by receiving the identification number allocated to the process.

7 Claims, 8 Drawing Sheets

FAULT DETECTING METHOD AND INFORMATION PROCESSING APPARATUS

CROSS-REFERENCE TO RELATED APPLICATIONS

This application is based upon and claims the benefit of prior Japanese Patent Application No. 2008-142285 filed on May 30, 2008, the entire contents of which are incorporated herein by reference.

FIELD

The embodiment discussed herein is related to a fault detecting method, a fault detecting program and an information processing apparatus, which detect a fault in a process executing a predetermined operation.

BACKGROUND

An active server, if disabled from continuing the predetermined operation, takes over the predetermined operation to a standby server, whereby the standby server continuously performs the predetermined operation. For example, if a fault occurs in the process which executes the predetermined operation, the active server gets disabled from continuing the predetermined operation. The process with the occurrence of the fault is terminated, and the active server is forcibly stopped (which is also called a forced panic) whereby the standby server takes over the predetermined operation.

An UNIX-based operating system includes a /proc file system. The /proc file system is stored with text-formatted information about a kernel and an in-execution process. Whether the process exists on a memory or not is checked by monitoring a process structure of the /proc file system in a way that uses a polling-oriented monitoring technique. Then, in the case of detecting that none of the process exists on the memory, the active server is forcibly stopped. A known technique is a technique of acquiring a terminated status of the process (for example, Japanese Laid-Open Patent Publication NO. 2007-133603).

SUMMARY

According to an aspect to the embodiment, a fault detecting method by which an information processing apparatus including a storage area separated into a user space and a kernel space executes, generating a core file of a process existing in the user space, retaining the process with the core file which starts being generated in the user space, and notifying a monitoring unit of an identification number of the process with the core file which starts being generated, wherein the monitoring unit detects a fault in the process by receiving the identification number allocated to the process.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENT

Figure 1:
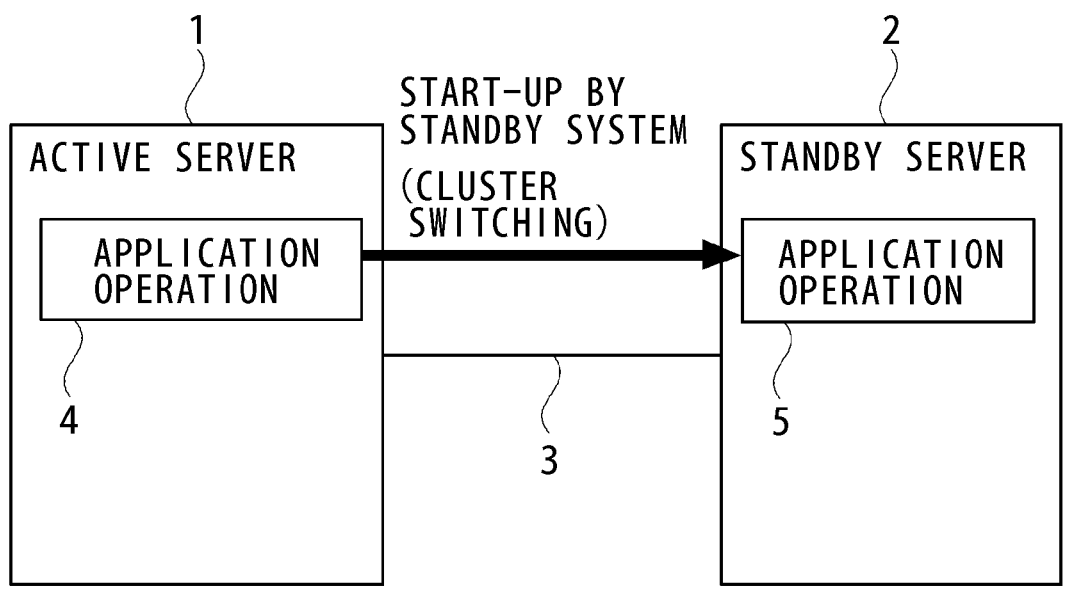
FIG. 1 is a diagram illustrating an architecture of the system.

There is a method of clarifying a cause of occurrence of the fault of the process by writing, to an auxiliary storage device such as a magnetic disk, the process information in a main storage device such as a memory and a register just before forcibly stopping the active server. In the case of forcibly stopping the active server after writing the process information in the main storage device to the auxiliary storage device, the process information in the main storage device is written in an intact status to the auxiliary storage device. In this case, the active server is not forcibly stopped till the process information in the main storage device is written to the auxiliary storage device, and a problem is a delay of the takeover of the operation to the standby server. Further, if the active server is forcibly stopped before the process information in the main storage device is written to the auxiliary storage device, the process information in the main storage device is not written in the intact status to the auxiliary storage device. Therefore, a problem is that the cause of the occurrence of the fault in the process can not be clarified from a content written to the auxiliary storage device.

There is a method of writing all of the storage contents in the main storage device to the auxiliary storage device and clarifying the cause of the occurrence of the fault in the process from the storage contents written to the auxiliary storage device. In the case of detecting that none of the process exists on the memory and forcibly stopping the active server, any information for knowing a status of the process is not left on the memory after the forced stop. Hence, such a problem arises that if all of the storage contents in the main storage device are written to the auxiliary storage device after the forced stop, the cause of the occurrence of the fault in the process can not be clarified from the storage contents written to the auxiliary storage device.

According to the fault detecting method, the monitoring unit is notified of the identification number of the process, and the monitoring unit detects the fault in the process existing in the user space by receiving the identification number of the process. The identification number of the process of which the monitoring unit is notified is an identification number of the process with a core file that starts being generated.

Accordingly, the monitoring unit receives the identification number of the process in a way that links to the generation of the core file, thereby enabling the fault in the process to be detected at a higher speed. The process with the core file which starts being generated is retained in the user space, and hence the cause of the occurrence of the fault in the process can be clarified from the core file and the process retained in the user space.

It is feasible to attain both of the fast failover from the active server to the standby server and the clarification of the cause of the occurrence of the fault in the process.

A cluster system according to the embodiment be described with reference to the drawings. A configuration in the following embodiment is an exemplification, and the disclosure is not limited to the configuration in the embodiment.

FIG. 1 illustrates an architecture of the system. The system includes an active server (which is also called an active node) 1 defined as an information processing apparatus and a standby server (which is also called a standby node) 2, in which the active server 1 and the standby server 2 are connected to each other via a network 3 such as a LAN (Local Area Network). The active server 1 is a server which performs predetermined operations. The active server 1 starts up an operation application 4 for executing the predetermined operations. The standby server 2 is a server that takes over the operation executed so far by the active server 1 if a hardware fault or an operation continuation disabled (operation-continuation-disabled) trouble such as a fault of the application occurs in the active server 1. The standby server 2 starts up an operation application 5 for executing predetermined operations.

If the operation continuation disabled trouble occurs in the active server 1, the active server 1 detects the operation continuation disabled trouble. When the active server 1 detects the operation continuation disabled, the active server 1 stops the operation application 4 or is forcibly stopped by itself. The standby server 2 starts up the operation application 5 and takes over the operations performed by the active server 1, thereby executing the predetermined operations. Thus, the system realizes high availability in such a way that if the operation continuation disabled trouble occurs in the active server 1, the standby server 2 takes over the operations performed by the active server 1. If the operation continuation disabled trouble occurs in the active server 1, the standby server 2 takes over the operations, which is also called cluster switching.

Figure 2:
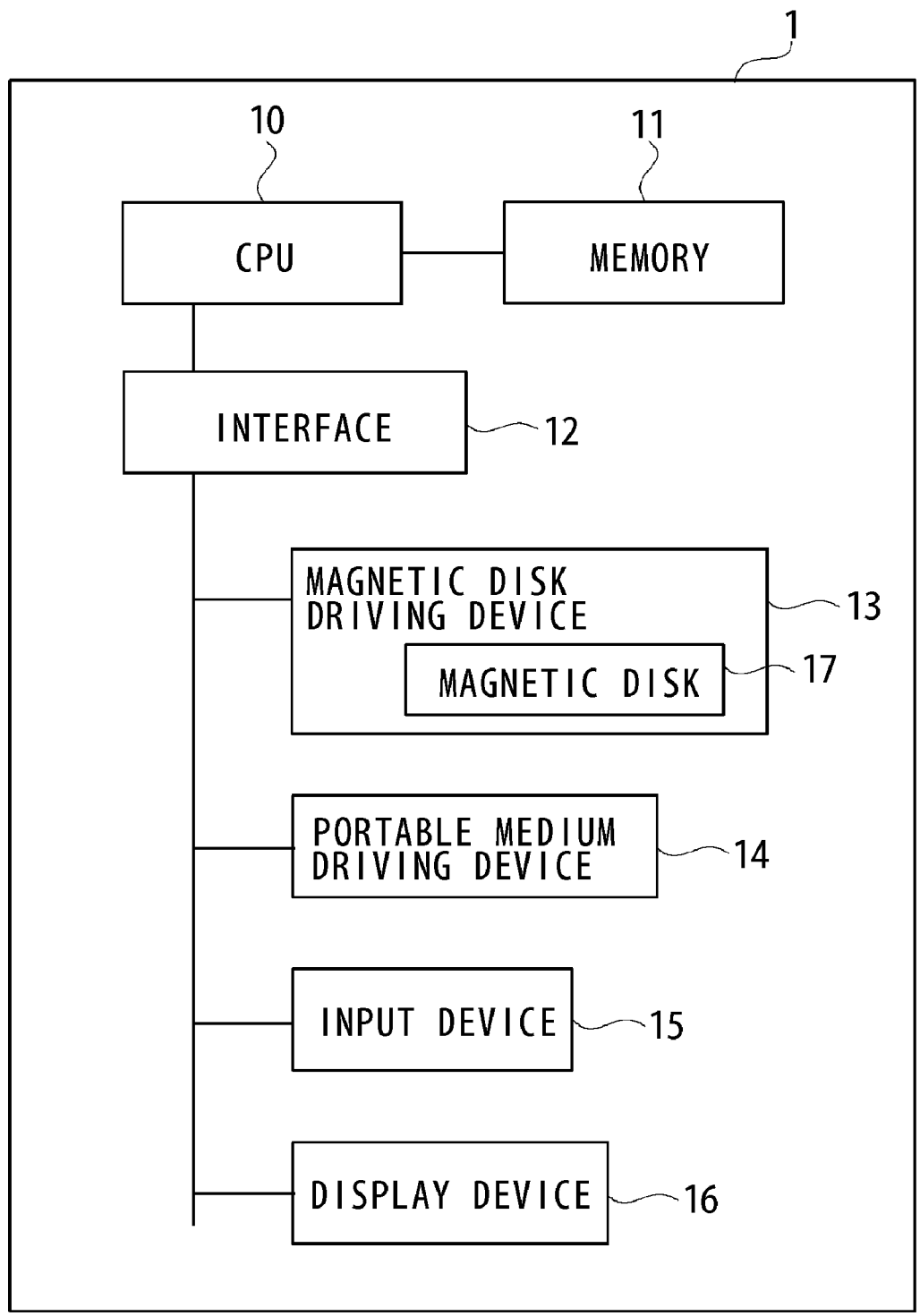
FIG. 2 is a diagram illustrating a hardware configuration of an active server.

FIG. 2 illustrates a hardware configuration of the active server 1 according to the embodiment. Note that the standby server 2 has the same hardware configuration as the active server 1 has. The active server 1 illustrated in FIG. 2 is exemplified by a personal computer, a workstation, a mainframe, etc. As illustrated in FIG. 2, the active server 1 includes a CPU (Central Processing Unit) 10 which controls the active server 1 by executing a computer program, and a memory 11 stored with the computer program executed by the CPU 10 and data processed by the CPU 10. Further, as illustrated in FIG. 2, the active server 1 includes an interface 12 for establishing connections between the CPU 10 and a variety of devices, a magnetic disc driving device 13, a portable medium driving device 14, an input device 15 and a display device 16.

The memory 11 is exemplified by a volatile RAM (Random Access Memory) and a nonvolatile ROM (Read Only Memory). The interface 12 may be either a serial interface such as a USB (Universal Serial Bus) or a parallel interface such as PCI (Peripheral Component Interconnect). Note that the CPU 10, though connected via the interface 12 to the respective devices, may be connected via a different type of interface to the devices. Moreover, a plurality of interfaces may also be bridge-connected.

The magnetic disc driving device 13 includes a magnetic disc 17. The magnetic disc driving device 13 records the data on the magnetic disc 17 and reads the data recorded on the magnetic disc 17. The magnetic disc 17 is stored with the program which is loaded into the memory 11. Further, the magnetic disc 17 is stored with the data processed by the CPU 10.

The portable medium driving device 14 is a driving device for, e.g., a CD (Compact Disc), a DVD (Digital Versatile Disk), an HD-DVD, a Blu-ray disc and so on. Moreover, the portable medium driving device 14 may also be an input/output device for a card medium having a nonvolatile memory like a flash memory, etc. The medium driven by the portable medium driving device 14 is stored with, e.g., a computer program installed into the magnetic disc 17, the input data, etc. The input device 15 is exemplified such as a keyboard, a mouse, a pointing device and a wireless remote controller.

The display device 16 displays the data processed by the CPU 10 and the data stored in the memory 11. The display device 16 is exemplified by a liquid crystal display device, a plasma display panel, a CRT (Cathode Ray Tube) an electroluminescence panel, etc.

Figure 3:
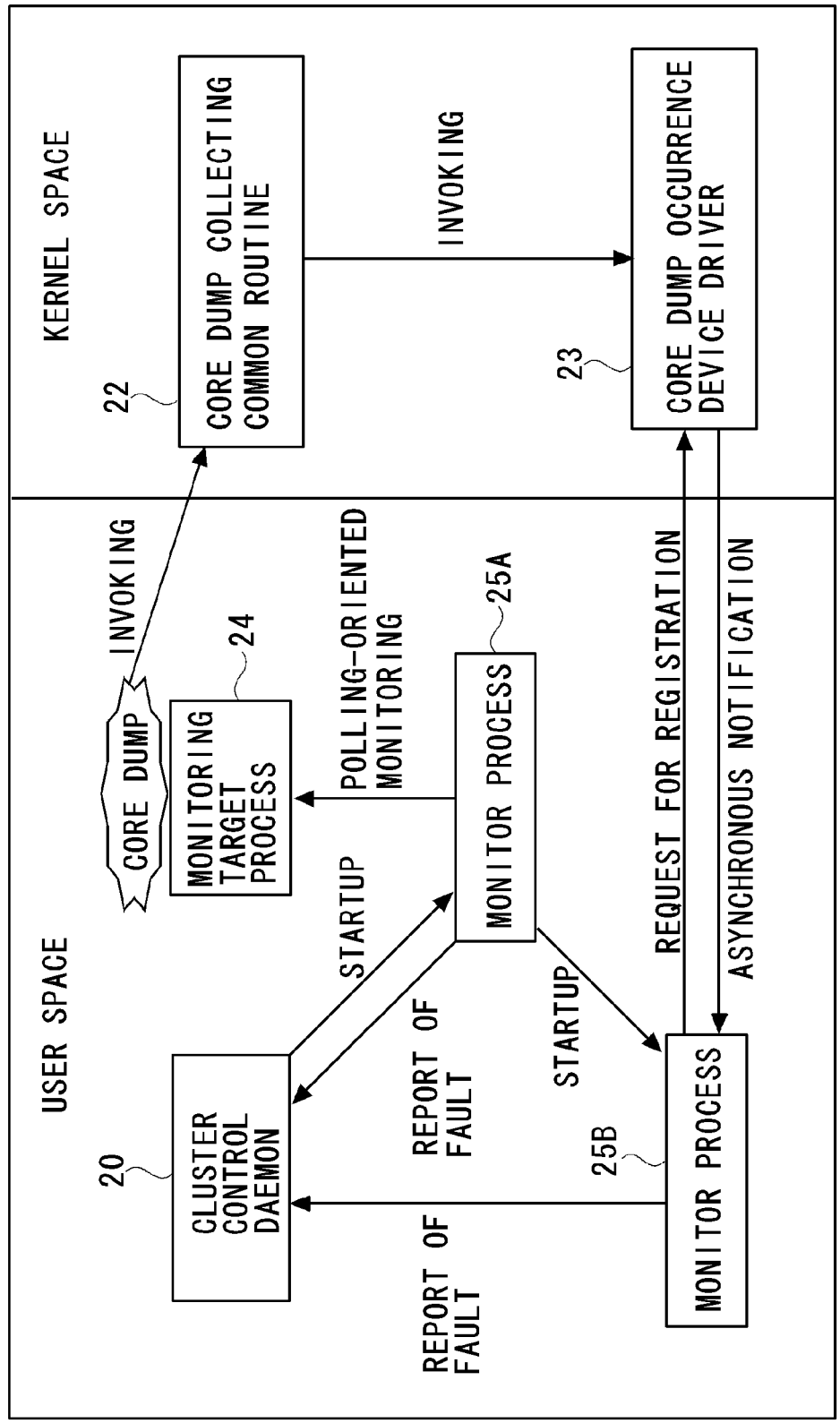
FIG. 3 is an explanatory diagram of a storage area of a memory.

FIG. 3 is an explanatory diagram of a storage area of the memory 11 provided in the active server 1. As illustrated in FIG. 3, the storage area of the memory 11 is separated into a user space and a kernel space. The CPU 10 has, as execution modes, a kernel mode defined as a privilege mode and a user mode defined as a non-privilege mode. The kernel space is an address space accessible by the CPU 10 in the kernel mode, in which an operating system for providing a basic service of the active server 1 operates. The user space is an address space accessible by the CPU 10 in the user mode, in which the operation application 4 and a cluster control daemon 20 operate.

A kernel 21 (unillustrated in FIG. 3) is a core of the operating system, and has a core dump collecting common routine 22 and a core dump occurrence device driver 23. Further, the kernel 21 provides functions such as a process management function, a memory management function, a file system function, a network function and a device driver function.

The kernel 21 detects a fault in a monitoring target process 24. The kernel 21, when detecting the fault in the monitoring target process 24, stops the monitoring target process 24. Then, the kernel 21, in the case of stopping the monitoring target process 24, starts generating a core file of the monitoring target process 24. The generation of the core file is referred to as a core dump. For example, if the in-execution monitoring target process 24 tries to write the data to a memory area to which any data originally does not be written, the kernel 21 detects the fault in the monitoring target process 24. The core file is file-formatted data of information for knowing a process status of the monitoring target process 24 just before being stopped. The information for knowing the process status (which will hereinafter be termed process status information) of the monitoring target process 24 just before being stopped is exemplified by data on a stack of the memory 11 and data on a register of the CPU 10 just before the monitoring target process 24 stops.

The cluster control daemon 20 is a program for, when detecting the operation continuation disabled trouble of the active server 1, stopping the operation application 4 or forcibly stopping the active server 1 as the necessity may arise. The cluster control daemon 20, in the case of forcibly stopping the active server 1, takes over the operation executed so far by the active server 1 to the standby server 2.

The monitoring target process 24 is a process generated when the operation application 4 is executed by the CPU 10, the memory 11, etc. A monitoring process 25A is a process started up (generated) by the cluster control daemon 20 when the monitoring target process 24 is generated. A monitoring process 25B (corresponding to a monitoring unit) is a process started up (generated) by the monitoring target process 24. The monitoring target process 24, the monitoring process 25A and the monitoring process 25B exist in the user space.

The kernel 21 allocates a process ID defined as a unique identification number to each of the monitoring target process 24, the monitoring process 25A and the monitoring process 25B. The kernel 21 generates, in the storage area of the memory 11, a process management file (/proc) for managing the respective processes such as the monitoring target process 24, the monitoring process 25A and the monitoring process 25B. The process management file (/proc) is recorded with such items of process management information as the process ID and a group ID about each process.

The monitoring process 25A gives a query to the kernel 21, thus acquiring the process ID of the self-process (the monitoring process 25A). The monitoring process 25A periodically checks the process management file (/proc) by a polling-oriented technique, thereby monitoring whether the monitoring target process 24 exists in the user space or not. Accordingly, the monitoring target process 24 is subordinated under the monitoring by the monitoring process 25A.

The monitoring process 25A starts up the monitoring process 25B for starting to monitor the core dump of the monitoring target process 24. Hence, a relationship between the monitoring process 25A and the monitoring process 25B is that the monitoring process 25A is a parent process, while the monitoring process 25B is a child process.

The monitoring process 25B gives a query to the kernel 21, thus acquiring the process ID of the self-process (the monitoring process 25B). Further, the monitoring process 25B acquires, from the monitoring process 25A, the process ID of the monitoring target process 24 subordinated under the monitoring by the monitoring process 25A which has started up the self-process (the monitoring process 25B).

The monitoring process 25B requests the core dump occurrence device driver 23 to register the process ID of the monitoring target process 24 and the self-process ID (the process ID of the monitoring process 25B), and waits for notification of occurrence of the core dump from the core dump occurrence device driver 23. Namely, the monitoring process 25B notifies the core dump occurrence device driver 23 of the process ID of the monitoring target process 24 and the process ID of the monitoring process 25B itself, and waits for the occurrence of the core dump of the monitoring target process 24 asynchronously.

For example, the monitoring process 25B designates the process ID of the monitoring target process 24 and issues ioctl (I/O control) to the core dump occurrence device driver 23. Namely, the monitoring process 25B issues a system call for instructing of a request for registering the process ID of the monitoring target process 24. Then, the monitoring process 25B comes to a status of waiting for the notification of the occurrence of the core dump of the monitoring target process 24 from the core dump occurrence device driver 23. In this case, the notification of the occurrence of the core dump may involve using a message showing the occurrence of the core dump of the monitoring target process 24 and may also involve using the process ID of the monitoring target process 24.

The core dump occurrence device driver 23, when requested by the monitoring process 25B to register the process ID of the monitoring target process 24 and the process ID of the monitoring process 25B, registers the process ID of the monitoring target process 24 and the process ID of the monitoring process 25B in a core dump waiting table 40 (corresponding to a storage unit). The core dump waiting table 40 is a list-structured table generated in the storage area of the memory 11 or the magnetic disc 17, and is managed by the core dump occurrence device driver 23.

Figure 4:
FIG. 4 is an explanatory diagram of a core dump waiting table.

The core dump waiting table 40 is registered with the process ID of the monitoring target process 24 and the process ID of the monitoring process 25B in a way that associates these process IDs with each other. To be specific, the core dump occurrence device driver 23 registers the core dump waiting table 40 with, as 2-tuple elements, the process ID of the monitoring target process 24 and the process ID of the monitoring process 25B, which are requested to be registered by the monitoring process 25B. FIG. 4 illustrates an example in the case of registering the process ID of the monitoring target process 24 and the process ID of the monitoring process 25B as the 2-tuple elements in the core dump waiting table 40. Herein, an assumption is that the two monitoring target processes 24 and the two monitoring processes 25B exist in the user space.

[Process ID-A] and [Process ID-C] are registered in a row 1 of the core dump waiting table 40 in FIG. 4. [Process ID-A] is one process ID of the two monitoring processes 25B existing in the user space. [Process ID-C] is the other process ID of the two monitoring processes 25B existing in the user space. The monitoring process 25B assigned the [Process ID-A] monitors the monitoring target process 24 assigned [Process ID-B].

[Process ID-B] and [Process ID-D] are registered in a row 2 of the core dump waiting table 40 in FIG. 4. [Process ID-B] is one process ID of the two monitoring target processes 24 existing in the user space. [Process ID-D] is the other process ID of the two monitoring target processes 24 existing in the user space. The monitoring process 25B assigned the [Process ID-C] monitors the monitoring target process 24 assigned [Process ID-D].

[Process ID-A] and [Process ID-B] are registered as the 2-tuple elements in a column of an element 1 of the core dump waiting table 40 in FIG. 4. [Process ID-C] and [Process ID-D] are registered as the 2-tuple elements in the column of an element 2 of the core dump waiting table 40 in FIG. 4.

Thus, the plurality of monitoring target processes 24 and the plurality of monitor processes 25B may be registered in the core dump waiting table 40. The core dump occurrence device driver 23 registers, each time the registration request is received from the monitoring process 25B, the process ID of the monitoring target process 24 and the process ID of the monitoring process 25B as the 2-tuple elements in the core dump waiting table 40.

The core dump collecting common routine 22 is, if the core dump of the monitoring target process 24 occurs, a program invoked by the kernel 21. The core dump collecting common routine 22 invokes the core dump occurrence device driver 23 by use of a hook function of the kernel 21.

The core dump collecting common routine 22 acquires, from the kernel 21, the process ID of the monitoring target process 24 in which the core dump occurs. The monitoring target process 24 with the occurrence of the core dump is also called the monitoring target process 24 in which generation of a core file is started. Then, the core dump collecting common routine 22 transfers the process ID of the monitoring target process 24 with the occurrence of the core dump to the core dump occurrence device driver 23.

The core dump occurrence device driver 23 acquires, from the core dump collecting common routine 22, the process ID of the monitoring target process 24 with the occurrence of the core dump. The core dump occurrence device driver 23 sends notification showing the occurrence of the core dump to the monitoring process 25B waiting for the notification of the occurrence of the core dump of the monitoring target process 24. As described above, the notification of the occurrence of the core dump may involve using the message showing the occurrence of the core dump of the monitoring target process 24 and may also involve using the process ID of the monitoring target process 24.

The monitoring process 25B receives the message showing the occurrence of the core dump of the monitoring target process 24 or the process ID of the monitoring target process 24, and thus detects the occurrence of the core dump of the monitoring target process 24.

The monitoring process 25B, when detecting the occurrence of the core dump of the monitoring target process 24, reports the fault of the monitoring target process 24 to the cluster control daemon 20. In this case, the monitoring process 25B may report the fault of the monitoring target process 24 by sending a message showing the fault of the monitoring target process 24 or the process ID of the monitoring target process 24.

The cluster control daemon 20 receives the report about the fault in the monitoring target process 24, thereby detecting the occurrence of the operation continuation disabled trouble in the active server 1. Then, the cluster control daemon 20 forcibly stops the active server 1 according to the necessity.

The core dump collecting common routine 22 and the core dump occurrence device driver 23 may previously be registered in a source code of the kernel 21 and may also be incorporated as a module into the kernel 21. The cluster control daemon 20, the kernel 21, the core dump collecting common routine 22, the core dump occurrence device driver 23, the monitor process 25A and the monitor process 25B are executed by CPU 10, the memory 11, etc, thereby enabling the functions described above to be realized.

Figure 5:
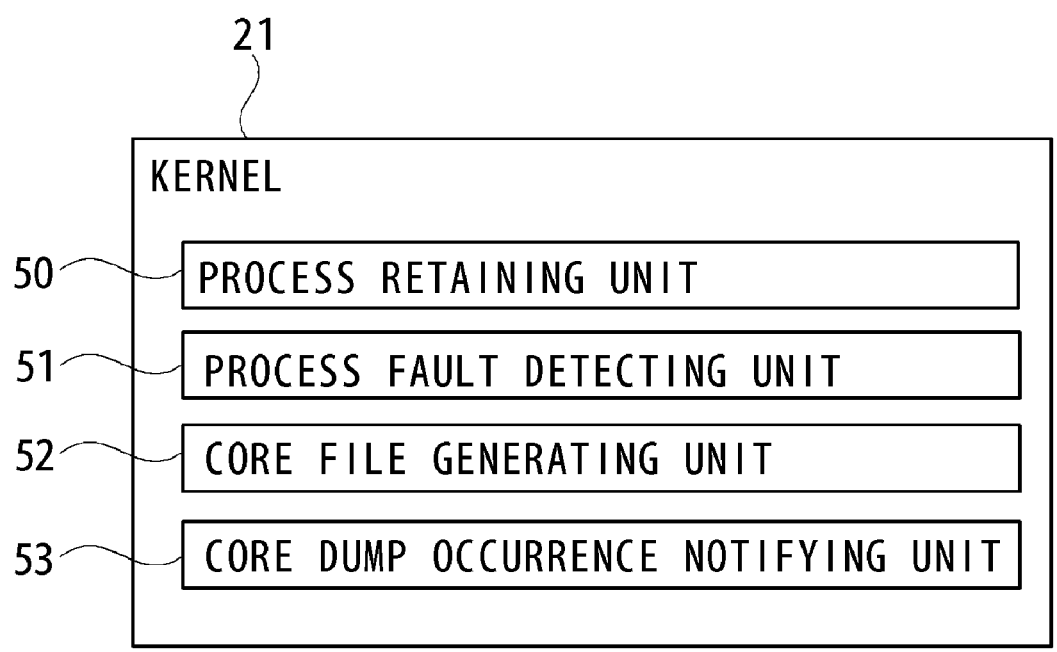
FIG. 5 is a function block diagram of a kernel.

FIG. 5 is a diagram of function blocks of the kernel 21. As illustrated in FIG. 5, the kernel 21 includes a process retaining unit 50, a process fault detecting unit 51, a core file generating unit 52 and a core dump occurrence notifying unit 53.

The process retaining unit 50 records process management information of the monitoring target process 24, the monitor process 25A and the monitor process 25B in a process management file (/proc). Further, the process retaining unit 50 deletes the process management information of the monitoring target process 24, the monitor process 25A and the monitor process 25B from the process management file (/proc).

The process fault detecting unit 51 detects the fault of the monitoring target process 24. For example, when the in-execution monitoring target process 24 tries to write the data to a write-protect area of the memory 11, the process fault detecting unit 51 detects the fault in the monitoring target process 24.

The process retaining unit 50, when the process fault detecting unit 51 detects the fault in the monitoring target process 24, stops the monitoring target process 24. In this case, the process retaining unit 50 notifies the monitoring target process 24 of a stop instruction signal and thus stops the monitoring target process 24. Then, the process retaining unit 50 retains the monitoring target process 24 in the user space. Namely, the process retaining unit 50 sets the monitoring target process 24 in a stopping status without deleting the process management information of the monitoring target process 24 from the process management file (/proc) The process retaining unit 50, when given an instruction to terminate the monitoring target process 24 from an operator etc of the active server 1, notifies the monitoring target process 24 of a terminating instruction signal, and thus terminates the monitoring target process 24. Then, the process retaining unit 50 deletes the process management information of the monitoring target process 24 from the process management file (/proc).

The core file generating unit 52 generates the core file of the monitoring target process 24. The core dump occurrence notifying unit 53, when the core file generating unit 52 starts to generate the core file of the monitoring target process 24, invokes the core dump collecting common routine 22. Then, the core dump occurrence notifying unit 53 transfers the process ID of the monitoring target process 24 with the occurrence of the core dump to the core dump collecting common routine 22.

Herein, a synchronous write mode and an asynchronous write mode will be explained. The core file generating unit 52 generates the core file of the monitoring target process 24 in the synchronous write mode or the asynchronous write mode.

In the case of generating the core file of the monitoring target process 24 in the synchronous write mode, the core file generating unit 52 generates the core file in the storage area of the magnetic disk 17 and thereafter notifies the cluster control daemon 20 of completion of generating the core file.

When the core file generating unit 52 generates the core file of the monitoring target process 24 in the synchronous write mode, the cluster control daemon 20 forcibly stops the active server 1 after receiving completion notification of generating the core file from the core file generating unit 52. Namely, the cluster control daemon 20 does not forcibly stop the active server 1 till receiving the completion notification of generating the core file from the core file generating unit 52 even if having already received the report of the fault in the monitoring target process 24. In the case of the synchronous write mode, the generation of the core file of the monitoring target process 24 is completed just when the cluster control daemon 20 forcibly stops the active server 1, and hence the process status information is saved in a substantially intact form as the core file on the magnetic disk 17.

In the case of generating the core file of the monitoring target process 24 in the asynchronous write mode, the core file generating unit 52 temporarily saves the process status information in a cache area of the memory 11, and writes a content in the cache area to the magnetic disk 17 at a fixed interval. Namely, the core file generating unit 52 generates the core file of the monitoring target process 24 at the fixed interval in the storage area of the magnetic disk 17.

In the case of generating the core file of the monitoring target process 24 in the asynchronous write mode, the core file generating unit 52 finishes generating the core file of the monitoring target process 24 just when the cluster control daemon 20 forcibly stops the active server 1.

If the generation of the core file of the monitoring target process 24 is completed just when the cluster control daemon 20 forcibly stops the active server 1, the process status information is saved in the substantially intact form as the core file on the magnetic disk 17.

If the generation of the core file of the monitoring target process 24 is not completed just when the cluster control daemon 20 forcibly stops the active server 1, part of the process status information is saved as the core file on the magnetic disk 17. In this case, the process status information is in a status of being saved in the cache area of the memory 11.

The active server 1 is forcibly stopped in a status where the monitoring target process 24 is saved in the user space. If the generation of the core file of the monitoring target process 24 is completed just when forcibly stopping the active server 1, the process status information is saved in the substantially intact form as the core file on the magnetic disk 17. A cause of the fault in the monitoring target process 24 can be clarified by analyzing the core file of the monitoring target process 24, which is saved on the magnetic disk 17.

If the generation of the core file of the monitoring target process 24 is not completed just when forcibly stopping the active server 1, the process status information is saved in the cache area of the memory 11. In this case, the data on the memory 11 is generated (saved) as the memory dump data (file) on the magnetic disk 17 by dint of the memory dump (memory dump function). The monitoring target process 24 is in the status of being retained in the user space. Namely, this is the status in which the process management information of the monitoring target process 24 is recorded in the process management file (/proc). The process status information is extracted from the memory dump data in a way that refers to the process management information of the monitoring target process 24, which is recorded in the process management file (/proc), thereby enabling the core file of the monitoring target process 24 to be generated.

In the embodiment, the function of generating (saving) all of the data on the memory 11 as a file (dump file) in the predetermined storage area is called the memory dump. The predetermined storage area may be a storage area on the magnetic disk 17 of the active server 1 and may also be a storage area of a storage device different from the active server 1. Further, in the embodiment, the file-formatted data generated by performing the memory dump is termed the memory dump data. The cause of the fault in the monitoring target process 24 can be clarified by analyzing the core file of the monitoring target process 24, which is extracted from the memory dump data and thus generated. Moreover, the cause of the fault in the monitoring target process 24 can be clarified by analyzing the process status information contained in the memory dump data.

Figure 6:
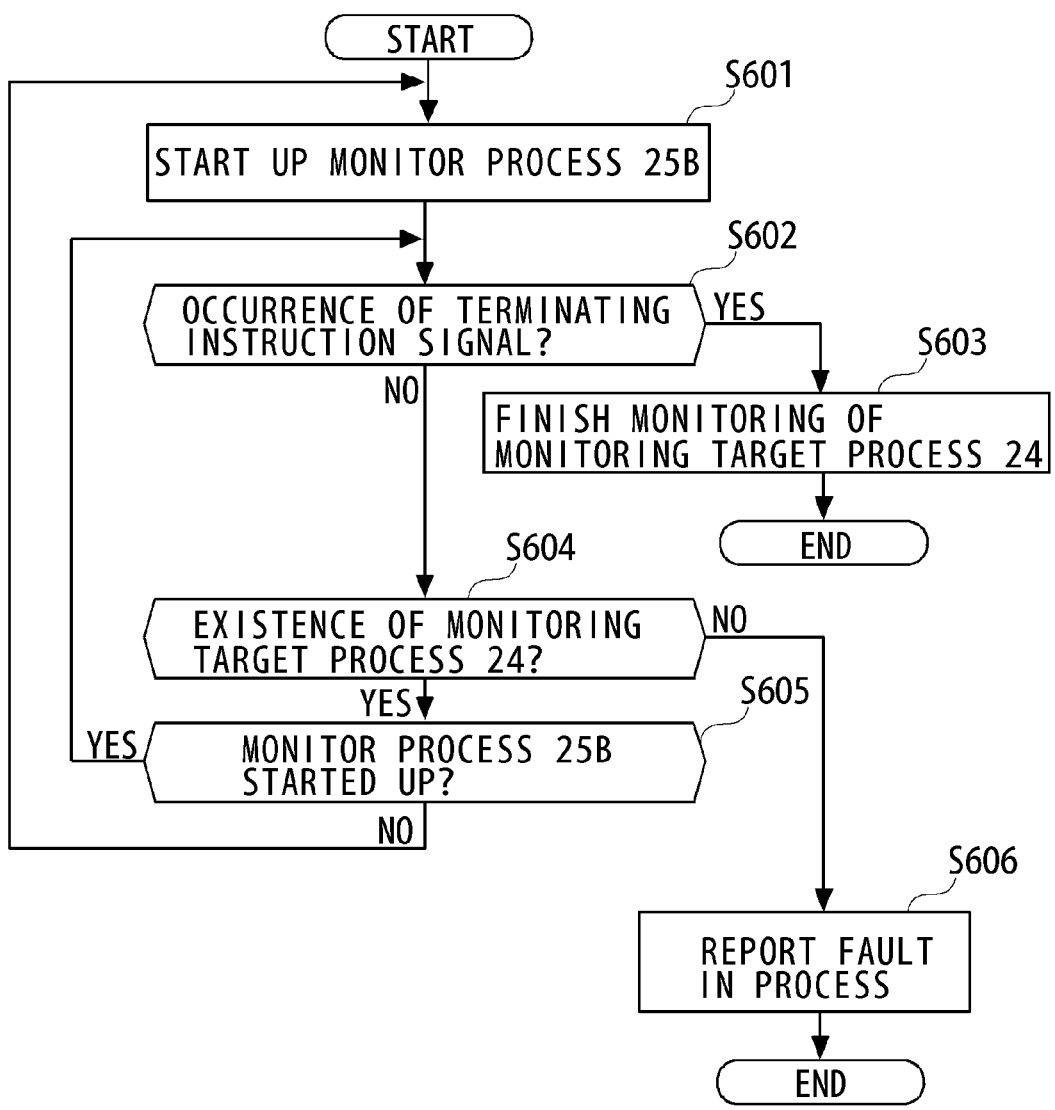
FIG. 6 is a flowchart illustrating a flow of a process in which a monitor process monitors a monitoring target process.

FIG. 6 is a flowchart illustrating a flow of the process in which the monitor process 25A monitors the monitoring target process 24. When the cluster control daemon 20 starts up the monitor process 25A, the monitor process 25A executes the process illustrated in FIG. 6.

To start with, the monitor process 25A starts up the monitor process 25B (S601). Next, the monitor process 25A determines whether the terminating instruction signal occurs or not (S602). The terminating instruction signal is a signal used for the cluster control daemon 20 to terminate the monitor process 25A. The terminating instruction signal is transmitted to the monitoring target process 24 from the cluster control daemon 20.

If the terminating instruction signal occurs (YES in the process of S602), the monitor process 25A finishes monitoring the monitoring target process 24 (S603). If the monitor process 25B is started up in the process in S603, the monitor process 25A finishes monitoring the monitoring target process 24 after terminating the monitor process 25B.

Whereas if the terminating instruction signal does not occur (NO in the process of S602), the monitor process 25A determines whether the monitoring target process 24 exists in the user space or not (S604). In this case, the monitor process 25A may determine whether the monitoring target process 24 exists in the user space or not in a way that checks the process management file (/proc) by the polling-oriented technique.

If the monitoring target process 24 exists in the user space (YES in the process of S604), the monitor process 25A determines whether the monitor process 25B is started up or not (S605). If the monitor process 25B is started up (YES in the process of S605), the monitor process 25A advances to the process of S602. In this case, the monitor process 25A may advance to the process of S602 after a predetermined period of time has elapsed. The predetermined period of time is a period of time that can be arbitrarily set, and several seconds may be set as the predetermined period of time.

Whereas if the monitor process 25B is not started up (NO in the process of S605), the monitor process 25A advances to the process of S601. In this case, the monitor process 25A may advance to the process of S601 after the predetermined period of time has elapsed. The predetermined period of time is a period of time that can be arbitrarily set, and several seconds may be set as the predetermined period of time.

Further, if the monitoring target process 24 does not exist in the user space (NO in the process of S604), the monitor process 25A reports the fault in the monitoring target process 24 to the cluster control daemon 20 (S606). For example, the monitoring target process 24 falls into the terminated status for the reason of hang-up etc of the monitoring target process 24, thereby the monitoring target process 24 does not exist in the user space. In this case, the monitor process 25A reports the fault in the monitoring target process 24 to the cluster control daemon 20. Then, the monitor process 25A finishes monitoring the monitoring target process 24.

Figure 7:
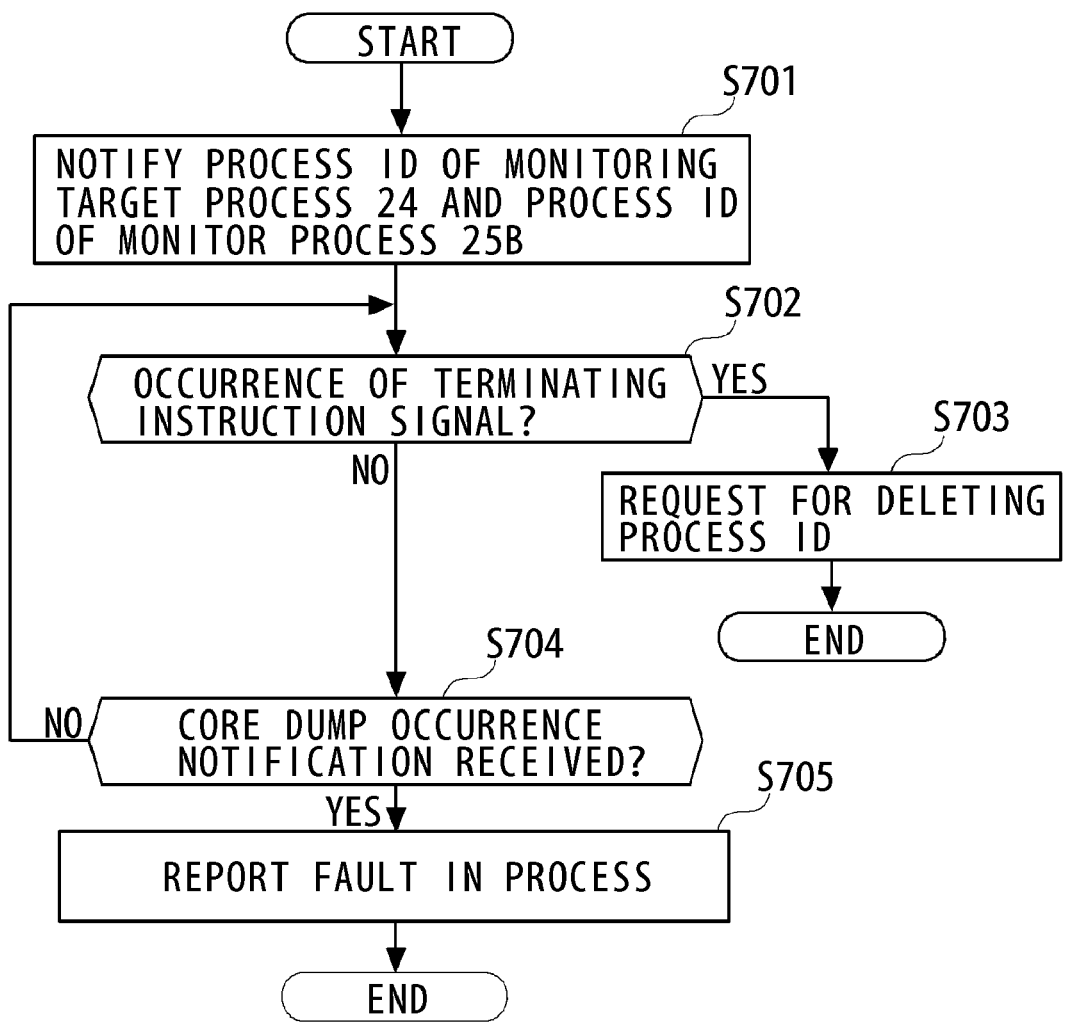
FIG. 7 is a flowchart illustrating a process in which a monitor process asynchronously waits for occurrence of a core dump of the monitoring target process.

FIG. 7 is a flowchart illustrating a flow of a process in which the monitor process 25B asynchronously waits for the occurrence of the core dump of the monitoring target process 24. If the monitor process 25B is started up by the monitor process 25A, the monitor process 25B executes the process illustrated in FIG. 7.

To begin with, the monitor process 25B notifies the core dump occurrence device driver 23 of the process ID of the monitoring target process 24 and the process ID (the self-process ID) of the monitor process 25B (S701). Specifically, the monitor process 25B issues a command for registering the process ID of the monitoring target process 24 and the process ID of the monitor process 25B to the core dump occurrence device driver 23 in a way that uses the ioctl. Namely, the monitor process 25B requests the core dump occurrence device driver 23 to register the process ID of the monitoring target process 24 and the process ID of the monitor process 25B in the core dump waiting table 40. The core dump occurrence device driver 23 receiving the request registers the process ID of the monitoring target process 24 and the process ID of the monitor process 25B as the 2-tuple elements in the core dump waiting table 40.

Next, the monitor process 25B determines whether the terminating instruction signal occurs or not (S702). The terminating instruction signal is the signal used for the cluster control daemon 20 to terminate the monitor process 25B. The terminating instruction signal is transmitted to the monitor process 25B from the cluster control daemon 20.

If the terminating instruction signal occurs (YES in the process of S702), the monitor process 25B requests the core dump occurrence device driver 23 to delete the process ID of the monitoring target process 24 and the process ID of the monitor process 25B (S703). To be specific, the monitor process 25B issues a command for deleting the process ID of the monitoring target process 24 and the process ID of the monitor process 25B from the core dump waiting table 40 by use of the ioctl. The core dump occurrence device driver 23 receiving the request deletes the process ID of the monitoring target process 24 and the process ID of the monitor process 25B from the core dump waiting table 40. The monitor process 25B, in the case of executing the process of S703, terminates the process of asynchronously waiting for the occurrence of the core dump of the monitoring target process 24.

Whereas if the terminating instruction signal does not occur (NO in the process of S702), the monitor process 25B determines whether or not the notification of the occurrence of the core dump is received from the core dump occurrence device driver 23 (S704). For example, the monitor process 25B determines whether or not the message indicating the occurrence of the core dump of the monitoring target process 24 or the process ID of the monitoring target process 24 is received from the core dump occurrence device driver 23.

In the case of receiving the notification of the occurrence of the core dump from the core dump occurrence device driver 23 (YES in the process of S704), the monitor process 25B reports the fault in the monitoring target process 24 to the cluster control daemon 20 (S705). Then, the monitor process 25B terminates the process of asynchronously waiting for the occurrence of the core dump of the monitoring target process 24. While on the other hand, if the notification of the occurrence of the core dump is not received from the core dump occurrence device driver 23 (NO in the process of S704) the monitor process 25B advances to the process of S702.

Figure 8:
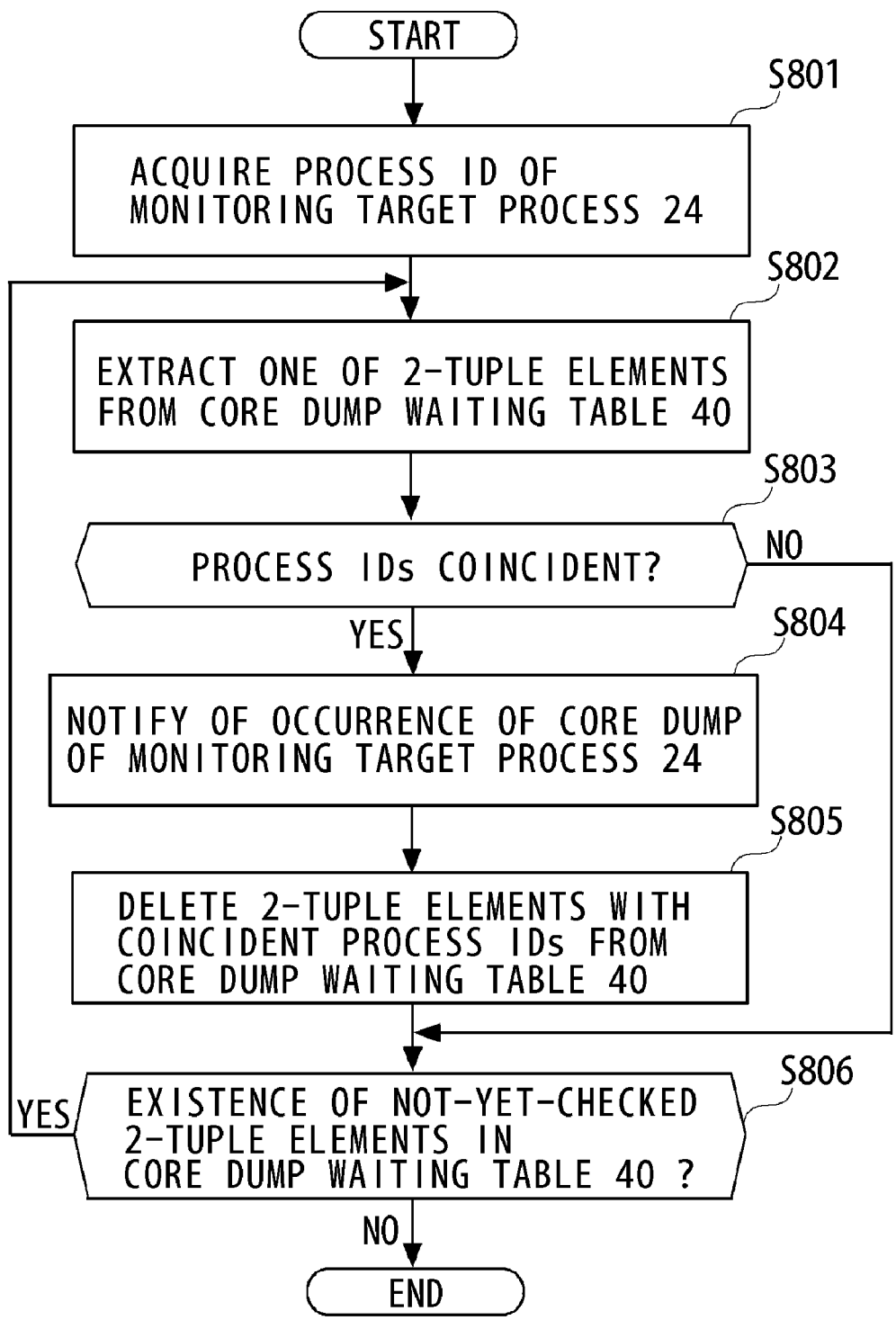
FIG. 8 is a flowchart asynchronously a process in which a core dump occurrence device driver notifies the monitor process of the occurrence of the core dump.

FIG. 8 is a flowchart illustrating a flow of a process (which will hereinafter be termed a core dump occurrence notifying process) in which the core dump occurrence device driver 23 notifies the monitor process 25B of the occurrence of the core dump. When the core dump collecting common routine 22 invokes the core dump occurrence device driver 23, the core dump occurrence device driver 23 executes the process illustrated in FIG. 8.

At first, the core dump occurrence device driver 23 acquires the process ID of the monitoring target process 24 with the occurrence of the core dump from the core dump collecting common routine 22 (S801).

Next, the core dump occurrence device driver 23 extracts one of the 2-tuple elements from the core dump waiting table 40 (S802). To be specific, the core dump occurrence device driver 23 extracts, from the core dump waiting table 40, the process ID of the monitoring target process 24 and the process ID of the monitor process 25B registered as the 2-tuple elements. In this case, the core dump occurrence device driver 23 may extract the 2-tuple elements registered first in the core dump waiting table 40.

Next, the core dump occurrence device driver 23 determines whether or not the process ID of the monitoring target process 24 which is acquired in the process of S801 is coincident with the process ID of the monitoring target process 24 which is contained in the 2-tuple elements extracted in the process of S802 (S803).

If the process ID of the monitoring target process 24 which is acquired in the process of S801 is coincident with the process ID of the monitoring target process 24 which is contained in the 2-tuple elements extracted in the process of S802 (YES in the process of S803), the core dump occurrence device driver 23 advances to the process of S804.

The core dump occurrence device driver 23 notifies the monitor process 25B of the occurrence of the core dump of the monitoring target process 24 (S804). Then, the core dump occurrence device driver 23 deletes the 2-tuple elements showing the coincidence of the process ID of the monitoring target process 24 from the core dump waiting table 40 (S805).

Whereas if the process ID of the monitoring target process 24 which is acquired in the process of S801 is not coincident with the process ID of the monitoring target process 24 which is contained in the 2-tuple elements extracted in the process of S802 (No in the process of S803) the core dump occurrence device driver 23 advances to the process of S806.

Next, the core dump occurrence device driver 23 determines whether or not not-yet-checked 2-tuple elements exist in the core dump waiting table 40 (S806). If the not-yet-checked 2-tuple elements exist in the core dump waiting table 40 (YES in the process of S806), the core dump occurrence device driver 23 advances to the process of S802. In this case, in the process of S802, the core dump occurrence device driver 23 extracts one of the not-yet-checked 2-tuple elements from the core dump waiting table 40.

Whereas if none of the not-yet-checked 2-tuple elements exist in the core dump waiting table 40 (NO in the process of S806), the core dump occurrence device driver 23 terminates the core dump occurrence notifying process.

Thus, the fault in the monitoring target process 24 is reported to the cluster control daemon 20 as triggered by such an event that the core file generating unit 52 starts generating the core file of the monitoring target process 24. Then, the cluster control daemon 20, when receiving the report of the fault in the monitoring target process 24 from the monitor process 25B, forcibly stops the active server 1 as the necessity may arise.

The fault in the monitoring target process 24 is detected based on the polling-oriented monitoring technique at the predetermined intervals (e.g., the intervals of several seconds). Accordingly, there might be a case of requiring several seconds for detecting the fault in the monitoring target process 24 since the fault has occurred in the monitoring target process 24. Hence, there might be a case in which the polling-oriented monitoring technique entails several seconds till the fault in the monitoring target process 24 is reported to the cluster control daemon 20.

According to the embodiment, the fault in the monitoring target process 24 due to the occurrence of the core dump is reported immediately when the core dump of the monitoring target process 24 occurs. Namely, the report of the fault in the monitoring target process 24 to the cluster control daemon 20 is linked to the occurrence of the core dump of the monitoring target process 24.

Accordingly, the fault in the monitoring target process 24 can be detected faster than detecting the fault in the monitoring target process 24 by the polling-oriented monitoring technique.

<Computer-Readable Storage Medium>

A program for making a computer realize any one of the functions described above can be recorded on a computer-readable storage medium. Then, the computer is made to read and execute the program on the computer-readable storage medium, whereby the function thereof can be provided. Herein, the computer-readable storage medium connotes a recording medium capable of storing information such as data and programs electrically, magnetically, optically, mechanically or by chemical action, which can be read from the computer. Among these computer-readable storage mediums, for example, a flexible disc, a magneto-optic disc, a CD-ROM, a CD-R/W, a DVD, a DAT, an 8 mm tape, a memory card, etc are given as those demountable from the computer. Further, a hard disc, a ROM, etc are given as the computer-readable storage medium fixed within the computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present inventions have been described in detail, it should be understood that the various changes, substitutions, and alterations could be made hereto without departing from the spirit and scope of the invention.

What is claimed is:

1. A fault detecting method for use in an information processing apparatus including a storage area separated into a user space and a kernel space, a generating unit working in the kernel space and a monitoring unit working in the user space; the fault detecting method comprising:
generating a core file of a process working in the user space by the generating unit;
retaining the process with the core file which starts being generated in the user space; and
notifying the monitoring unit of an identification number of the process with the core file which starts being generated by way of a device driver working in the kernel space;
wherein the monitoring unit detects a fault in the process with the core file which starts being generated by receiving the identification number of the process with the core file which starts being generated after starting a generation of the core file.

2. The fault detecting method according to claim 1, wherein the retaining includes retaining the process with the core file which starts being generated in the user space till the generation of the core file is completed.

3. The fault detecting method according to claim 1, wherein the information processing apparatus further executes:
registering an identification number of the process in a storage unit by accepting a request for registering the identification number of the process from the monitoring unit; and
acquiring the identification number of the process with the core file which starts being generated,
wherein the notifying includes notifying, if the identification number of the process with the core file which starts being generated is registered in the storage unit, the monitoring unit of the identification number of the process with the core file which starts being generated.

4. A non-transitory computer-readable storage medium storing a fault detecting program for making an information processing apparatus including a storage area separated into a user space and a kernel space, a generating unit working in the kernel space and a monitoring unit working in the user space, the fault detecting program causing a computer to execute a procedure, the procedure comprising:
generating a core file of a process working in the user space by the generating unit;
retaining the process with the core file which starts being generated in the user space; and
notifying the monitoring unit of an identification number of the process with the core file which starts being generated by way of a device driver working in the kernel space;
wherein the monitoring unit detects a fault in the process with the core file which starts being generated by receiving the identification number of the process with the core file which starts being generated after starting a generation of the core file.

5. The non-transitory computer-readable storage medium that stored the fault detecting program according to claim 4, wherein the retaining includes retaining the process with the core file which starts being generated in the user space till the generation of the core file is completed.

6. An information processing apparatus including a storage area separated into a user space and a kernel space, the information processing apparatus comprising:
a generating unit configured to generate a core file of a process working in the user space;
a retaining unit configured to retain the process with the core file which starts being generated in the user space; and
a notifying unit configured to notify a monitoring unit working in the user space of an identification number of the process with the core file which starts being generated by way of a device driver working in the kernel space,
wherein the monitoring unit detects a fault in the process with the core file which starts being generated by receiving the identification number of the process with the core file which starts being generated after the generating unit working in the kernel space started generating the core file.

7. The information processing apparatus according to claim 6, wherein the retaining unit retains the process with the core file which starts being generated in the user space till the generation of the core file is completed.

* * * * *